(12) United States Patent
Kirby et al.

(10) Patent No.: US 8,859,052 B2
(45) Date of Patent: *Oct. 14, 2014

(54) METHODS FOR MAKING ENVIRONMENTAL BARRIER COATINGS AND CERAMIC COMPONENTS HAVING CMAS MITIGATION CAPABILITY

(71) Applicant: General Electric Company, Schenectady, NY (US)

(72) Inventors: Glen Harold Kirby, Liberty Township, OH (US); Brett Allen Boutwell, West Chester, OH (US); John Frederick Ackerman, Laramie, WY (US)

(73) Assignee: General Electric Company, Schenectady, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 13/690,219

(22) Filed: Nov. 30, 2012

(65) Prior Publication Data

US 2013/0089673 A1 Apr. 11, 2013

Related U.S. Application Data

(63) Continuation of application No. 12/340,098, filed on Dec. 19, 2008, now Pat. No. 8,343,589.

(51) Int. Cl.
*C04B 41/89* (2006.01)
*B05D 1/36* (2006.01)
*C04B 41/52* (2006.01)
*C04B 41/00* (2006.01)
*C23C 28/04* (2006.01)

(52) U.S. Cl.
CPC .............. *C04B 41/89* (2013.01); *C04B 41/52* (2013.01); *C04B 41/009* (2013.01); *C23C 28/042* (2013.01)

USPC ........ 427/452; 427/454; 427/585; 427/248.1; 427/255.7; 427/255.15; 427/255.18; 427/255.19; 427/419.2; 427/419.3; 427/419.7; 204/192.15

(58) Field of Classification Search
CPC ..................................................... C23C 28/042
USPC ........................................................ 427/452
See application file for complete search history.

(56) References Cited

U.S. PATENT DOCUMENTS 4,774,150 A * 9/1988 Amano et al. ................ 428/690
5,660,885 A 8/1997 Hasz et al.

(Continued)

FOREIGN PATENT DOCUMENTS

JP 46-031844 * 9/1971
JP H10502310 A 3/1998

(Continued)

OTHER PUBLICATIONS

English translation of Japan 26-031844, which was first published in Japanese Sep. 1971.*

(Continued)

*Primary Examiner* — Katherine A Bareford
(74) *Attorney, Agent, or Firm* — General Electric Company; William Scott Andes; Brian P. Overbeck

(57) ABSTRACT

Methods of making components having calcium magnesium aluminosilicate (CMAS) mitigation capability include providing a component, applying an environmental barrier coating to the component, where the environmental barrier coating includes a CMAS mitigation composition selected from the group consisting of zinc aluminate spinel, alkaline earth zirconates, alkaline earth hafnates, rare earth gallates, beryl, and combinations thereof.

18 Claims, 3 Drawing Sheets

(56) References Cited

U.S. PATENT DOCUMENTS

| | | |
|---|---|---|
| 5,914,189 A | 6/1999 | Hasz et al. |
| 6,015,630 A * | 1/2000 | Padture et al. ............. 428/632 |
| 6,159,553 A | 12/2000 | Li |
| 6,261,643 B1 | 7/2001 | Hasz et al. |
| 6,296,941 B1 | 10/2001 | Eaton |
| 6,312,763 B1 | 11/2001 | Eaton |
| 6,444,335 B1 * | 9/2002 | Wang et al. ............. 428/701 |
| 6,617,037 B2 | 9/2003 | Sun |
| 6,759,151 B1 | 7/2004 | Lee |
| 7,001,679 B2 | 2/2006 | Campbell |
| 7,354,651 B2 | 4/2008 | Hazel |
| 7,357,994 B2 | 4/2008 | Hazel |
| 7,374,818 B2 | 5/2008 | Bhatia |
| 8,216,689 B2 | 7/2012 | Witz et al. |
| 8,343,589 B2 * | 1/2013 | Kirby et al. ............. 427/454 |
| 2003/0035907 A1 | 2/2003 | Campbell et al. |
| 2003/0118440 A1 * | 6/2003 | Zhao et al. ............. 415/118 |
| 2005/0074625 A1 | 4/2005 | Meschter |
| 2005/0164027 A1 * | 7/2005 | Lau et al. ............. 428/632 |
| 2006/0210800 A1 | 9/2006 | Spitsberg et al. |
| 2006/0280952 A1 | 12/2006 | Hazel et al. |
| 2006/0280954 A1 | 12/2006 | Spitsberg et al. |
| 2006/0280955 A1 | 12/2006 | Spitsberg et al. |
| 2008/0044662 A1 | 2/2008 | Schlichting |
| 2008/0044686 A1 | 2/2008 | Schlichting |
| 2008/0057326 A1 | 3/2008 | Schlichting |
| 2008/0113217 A1 | 5/2008 | Maloney |
| 2008/0113218 A1 | 5/2008 | Schlichting |
| 2009/0004427 A1 | 1/2009 | Sarrafi-Nour |

FOREIGN PATENT DOCUMENTS

| | | |
|---|---|---|
| JP | H10505299 A | 5/1998 |
| JP | 2009286127 A | 12/2009 |
| WO | 9631293 | 10/1996 |
| WO | 9631687 | 10/1996 |

OTHER PUBLICATIONS

International Search Report issued in connection with corresponding PCT Application No. PCT/US2009/066297 on Mar. 11, 2010.

International Search Report issued in connection with corresponding PCT Application No. PCT/US2009/066296 on Mar. 11, 2010.

Unofficial English translation of Jp Office Action issued May 27, 2014 in connection with corresponding Jp Patent Application No. 2011-542209.

* cited by examiner

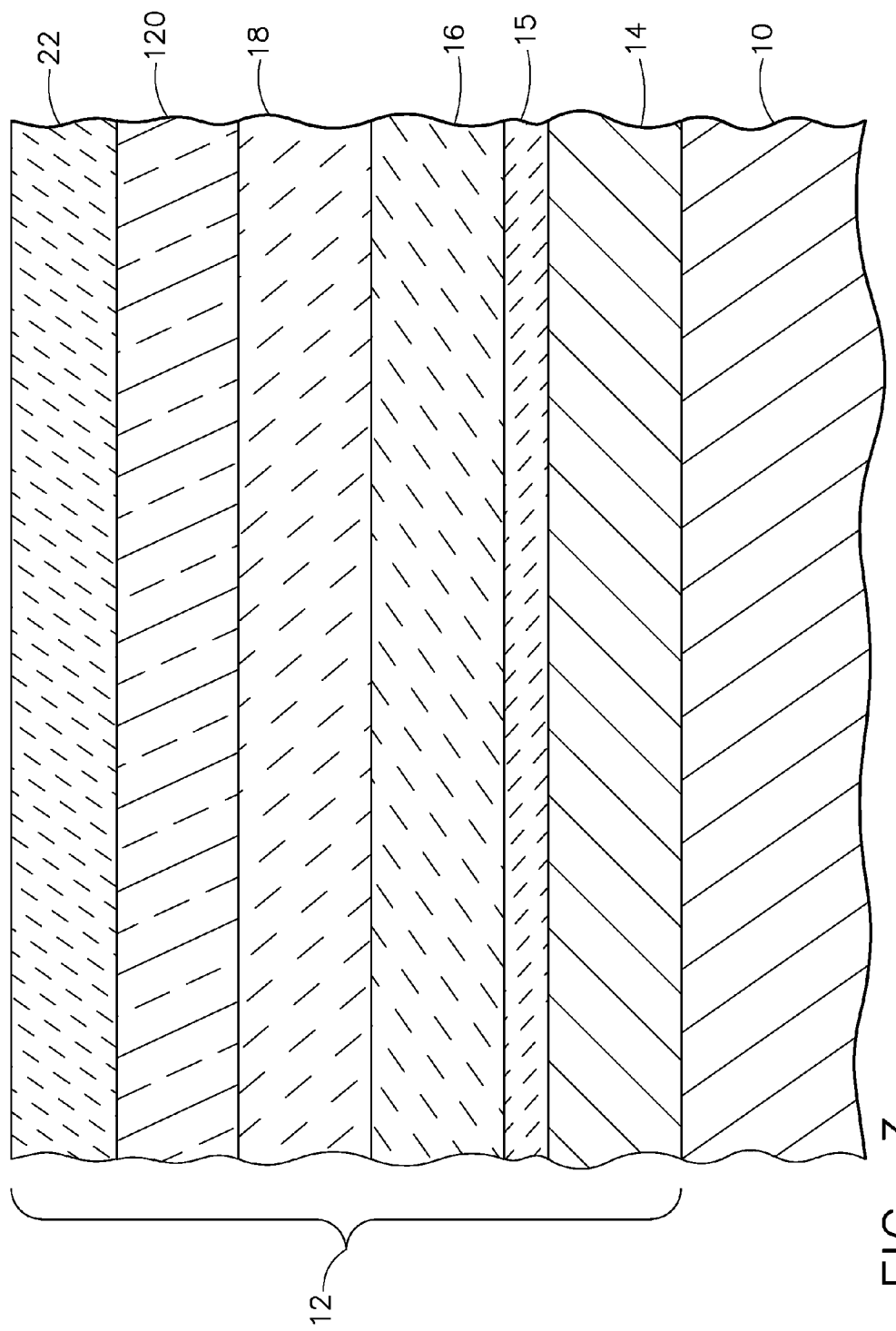

US 8,859,052 B2

METHODS FOR MAKING ENVIRONMENTAL BARRIER COATINGS AND CERAMIC COMPONENTS HAVING CMAS MITIGATION CAPABILITY

CROSS REFERENCE TO RELATED APPLICATIONS

This application is a continuation of U.S. patent application Ser. No. 12/340,098, now U.S. Pat. No. 8,343,589, filed Dec. 19, 2008, which is herein incorporated by reference in its entirety.

TECHNICAL FIELD

Embodiments described herein generally relate to methods for making environmental barrier coatings and ceramic components having CMAS mitigation capability.

BACKGROUND OF THE INVENTION

Higher operating temperatures for gas turbine engines are continuously being sought in order to improve their efficiency. However, as operating temperatures increase, the high temperature durability of the components of the engine must correspondingly increase. Significant advances in high temperature capabilities have been achieved through the formulation of iron, nickel, and cobalt-based superalloys. While superalloys have found wide use for components used throughout gas turbine engines, and especially in the higher temperature sections, alternative lighter-weight substrate materials have been proposed.

Ceramic matrix composites (CMCs) are a class of materials that consist of a reinforcing material surrounded by a ceramic matrix phase. Such materials, along with certain monolithic ceramics (i.e. ceramic materials without a reinforcing material), are currently being used for higher temperature applications. Using these ceramic materials can decrease the weight, yet maintain the strength and durability, of turbine components. Furthermore, since such ceramic materials can have higher temperature capability than metals, significant cooling air savings can be realized that increase the efficiency of a turbine engine. Therefore, such materials are currently being considered for many gas turbine components used in higher temperature sections of gas turbine engines, such as airfoils (e.g. turbines, and vanes), combustors, shrouds and other like components that would benefit from the lighter-weight and higher temperature capability these materials can offer.

CMC and monolithic ceramic components can be coated with environmental barrier coatings (EBCs) to protect them from the harsh environment of high temperature engine sections. EBCs can provide a dense, hermetic seal against the corrosive gases in the hot combustion environment. In dry, high temperature environments, silicon-based (nonoxide) CMCs and monolithic ceramics undergo oxidation to form a protective silicon oxide scale. However, the silicon oxide reacts rapidly with high temperature steam, such as found in gas turbine engines, to form volatile silicon species. This oxidation/volatilization process can result in significant material loss, or recession, over the lifetime of an engine component. This recession also occurs in CMC and monolithic ceramic components comprising aluminum oxide, as aluminum oxide reacts with high temperature steam to form volatile aluminum species as well.

Currently, most EBCs used for CMC and monolithic ceramic components consist of a three-layer coating system generally including a bond coat layer, at least one transition layer applied to the bond coat layer, and an optional outer layer applied to the transition layer. Optionally, a silica layer may be present between the bond coat layer and the adjacent transition layer. Together these layers can provide environmental protection for the CMC or monolithic ceramic component.

More specifically, the bond coat layer may comprise silicon and may generally have a thickness of from about 0.5 mils to about 6 mils. For silicon-based nonoxide CMCs and monolithic ceramics, the bond coat layer serves as an oxidation barrier to prevent oxidation of the substrate. The silica layer may be applied to the bond coat layer, or alternately, may be formed naturally or intentionally on the bond coat layer. The transition layer may typically comprise mullite, barium strontium aluminosilicate (BSAS), a rare earth disilicate, and various combinations thereof, while the optional outer layer may comprise BSAS, a rare earth monosilicate, a rare earth disilicate, and combinations thereof. There may be from 1 to 3 transition layers present, each layer having a thickness of from about 0.1 mils to about 6 mils, and the optional outer layer may have a thickness of from about 0.1 mils to about 40 mils.

Each of the transition and outer layers can have differing porosity. At a porosity of about 10% or less, a hermetic seal to the hot gases in the combustion environment can form. From about 10% to about 40% porosity, the layer can display mechanical integrity, but hot gases can penetrate through the coating layer damaging the underlying EBC. While it is necessary for at least one of the transition layer or outer layer to be hermetic, it can be beneficial to have some layers of higher porosity range to mitigate mechanical stress induced by any thermal expansion mismatch between the coating materials and the substrate.

Unfortunately, deposits of CMAS have been observed to form on components located within higher temperature sections of gas turbine engines, particularly in combustor and turbine sections. These CMAS deposits have been shown to have a detrimental effect on the life of thermal barrier coatings, and it is known that BSAS and CMAS chemically interact at high temperatures, i.e. above the melting point of CMAS (approximately 1150° C. to 1650° C.). It is also known that the reaction byproducts formed by the interaction of BSAS and CMAS can be detrimental to EBCs, as well as susceptible to volatilization in the presence of steam at high temperatures. Such volatilization can result in the loss of coating material and protection for the underlying component. Thus, it is expected that the presence of CMAS will interact with the EBC, thereby jeopardizing the performance of the component along with component life.

Accordingly, there remains a need for methods for making environmental barrier coatings and ceramic components having CMAS mitigation capability.

BRIEF DESCRIPTION OF THE INVENTION

Embodiments herein generally relate to methods of making components having CMAS mitigation capability comprising: providing a component; applying an environmental barrier coating to the component, the environmental barrier coating comprising a separate CMAS mitigation layer including a CMAS mitigation composition selected from the group consisting of zinc aluminate spinel, alkaline earth zirconates, alkaline earth hafnates, rare earth gallates, beryl, and combinations thereof.

Embodiments herein also generally relate to methods of making components having CMAS mitigation capability comprising: providing a component; applying an environmental barrier coating to the component, the environmental barrier coating comprising an integrated CMAS mitigation layer including: at least one outer layer material selected from the group consisting of BSAS, rare earth monosilicates, rare earth disilicates, and combinations thereof; and a CMAS mitigation composition selected from the group consisting of zinc aluminate spinel, alkaline earth zirconates, alkaline earth hafnates, hafnium silicate, zirconium silicate, rare earth gallates, rare earth phosphates, tantalum oxide, beryl, alkaline earth aluminates, rare earth aluminates, and combinations thereof.

Embodiments herein also generally relate to methods making components having CMAS mitigation capability comprising: providing a component; applying an environmental barrier coating to the component, the barrier coating comprising: a bond coat layer comprising silicon; an optional silica layer; at least one transition layer comprising a composition selected from the group consisting of mullite, barium strontium aluminosilicate (BSAS), and combinations thereof; an optional outer layer comprising an outer layer material selected from the group consisting of BSAS, rare earth monosilicates, rare earth disilicates, and combinations thereof; and a CMAS mitigation composition wherein the CMAS mitigation composition is selected from the group consisting of zinc aluminate spinel, alkaline earth zirconates, alkaline earth hafnates, rare earth gallates, beryl, and combinations thereof when the CMAS mitigation composition is included as a separate CMAS mitigation layer, and wherein the CMAS mitigation composition is selected from the group consisting of zinc aluminate spinel, alkaline earth zirconates, alkaline earth hafnates, hafnium silicate, zirconium silicate, rare earth gallates, rare earth phosphates, tantalum oxide, beryl, alkaline earth aluminates, rare earth aluminates, and combinations thereof when the CMAS mitigation composition is included as an integrated CMAS mitigation layer further comprising at least one outer layer material.

These and other features, aspects and advantages will become evident to those skilled in the art from the following disclosure.

BRIEF DESCRIPTION OF THE DRAWINGS

While the specification concludes with claims particularly pointing out and distinctly claiming the invention, it is believed that the embodiments set forth herein will be better understood from the following description in conjunction with the accompanying figures, in which like reference numerals identify like elements.

FIG. 3 is a schematic cross sectional view of one embodiment of an environmental barrier coating having an integrated CMAS mitigation layer in accordance with the description herein.

DETAILED DESCRIPTION OF THE INVENTION

Embodiments described herein generally relate to methods for making environmental barrier coatings and ceramic components having CMAS mitigation capability.

The CMAS mitigation compositions described herein may be suitable for use in conjunction with EBCs for substrates comprising CMCs, and monolithic ceramics. As used herein, "CMCs" refers to silicon-containing, or oxide-oxide, matrix and reinforcing materials. Some examples of CMCs acceptable for use herein can include, but should not be limited to, materials having a matrix and reinforcing fibers comprising non-oxide silicon-based materials such as silicon carbide, silicon nitride, silicon oxycarbides, silicon oxynitrides, and mixtures thereof. Examples include, but are not limited to, CMCs with silicon carbide matrix and silicon carbide fiber; silicon nitride matrix and silicon carbide fiber; and silicon carbide/silicon nitride matrix mixture and silicon carbide fiber. Furthermore, CMCs can have a matrix and reinforcing fibers comprised of oxide ceramics.

Specifically, the oxide-oxide CMCs may be comprised of a matrix and reinforcing fibers comprising oxide-based materials such as aluminum oxide ($Al_2O_3$), silicon dioxide ($SiO_2$), aluminosilicates, and mixtures thereof. Aluminosilicates can include crystalline materials such as mullite ($3Al_2O_3 \cdot 2SiO_2$), as well as glassy aluminosilicates.

As used herein, "monolithic ceramics" refers to materials comprising only silicon carbide, only silicon nitride, only alumina, only silica, or only mullite. Herein, CMCs and monolithic ceramics are collectively referred to as "ceramics."

As used herein, the term "barrier coating(s)" refers to environmental barrier coatings (EBCs). The barrier coatings herein may be suitable for use on ceramic substrate components 10 found in high temperature environments, such as those present in gas turbine engines. "Substrate component" or simply "component" refers to a component made from "ceramics," as defined herein.

Figure 1:
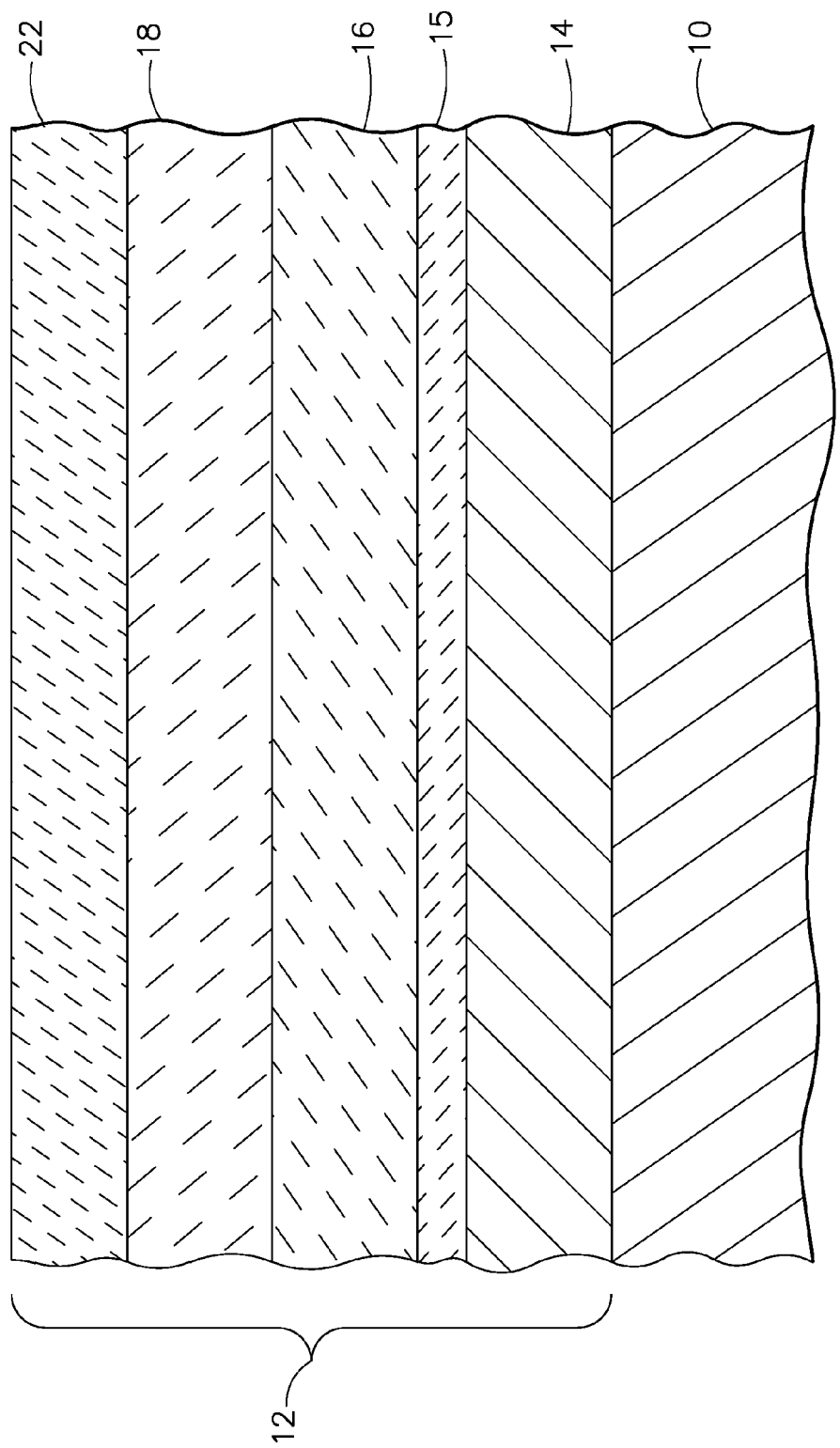
FIG. 1 is a schematic cross sectional view of one embodiment of an environmental barrier coating in accordance with the description herein.

More specifically, EBC 12 may generally comprise any existing environmental barrier coating system that generally comprises a silicon bond coat layer 14, an optional silica layer 15 adjacent to bond coat layer 14, at least one transition layer 16 adjacent to bond coat layer 14 (or silica layer 15 if present), an optional outer layer 18 adjacent to transition layer 16, and an optional abradable layer 22 adjacent to transition layer 16 (or outer layer 18 if present), as shown generally in FIG. 1. As defined previously herein, "transition layer" 16 refers to any of mullite, BSAS, a rare earth disilicate, and various combinations thereof, while "outer layer" 18 refers to any of the "outer layer materials" of BSAS, rare earth monosilicates, rare earth disilicates, (collectively referred to herein as "rare earth silicates") and combinations thereof, unless specifically noted otherwise.

Bond coat layer 14, optional silica layer 15, transition layer 16, optional outer layer 18, and optional abradable layer 22 may be made using conventional methods known to those skilled in the art and applied as described herein below.

Unlike existing EBCs, and in addition to the layers described previously, the present embodiments also include CMAS mitigation compositions to help prevent the EBC from degradation due to reaction with CMAS in high temperature engine environments. Such CMAS mitigation compositions may be present as a separate CMAS mitigation layer on top of the existing EBC systems, or as an integrated CMAS mitigation layer, as defined herein below.

Figure 2:
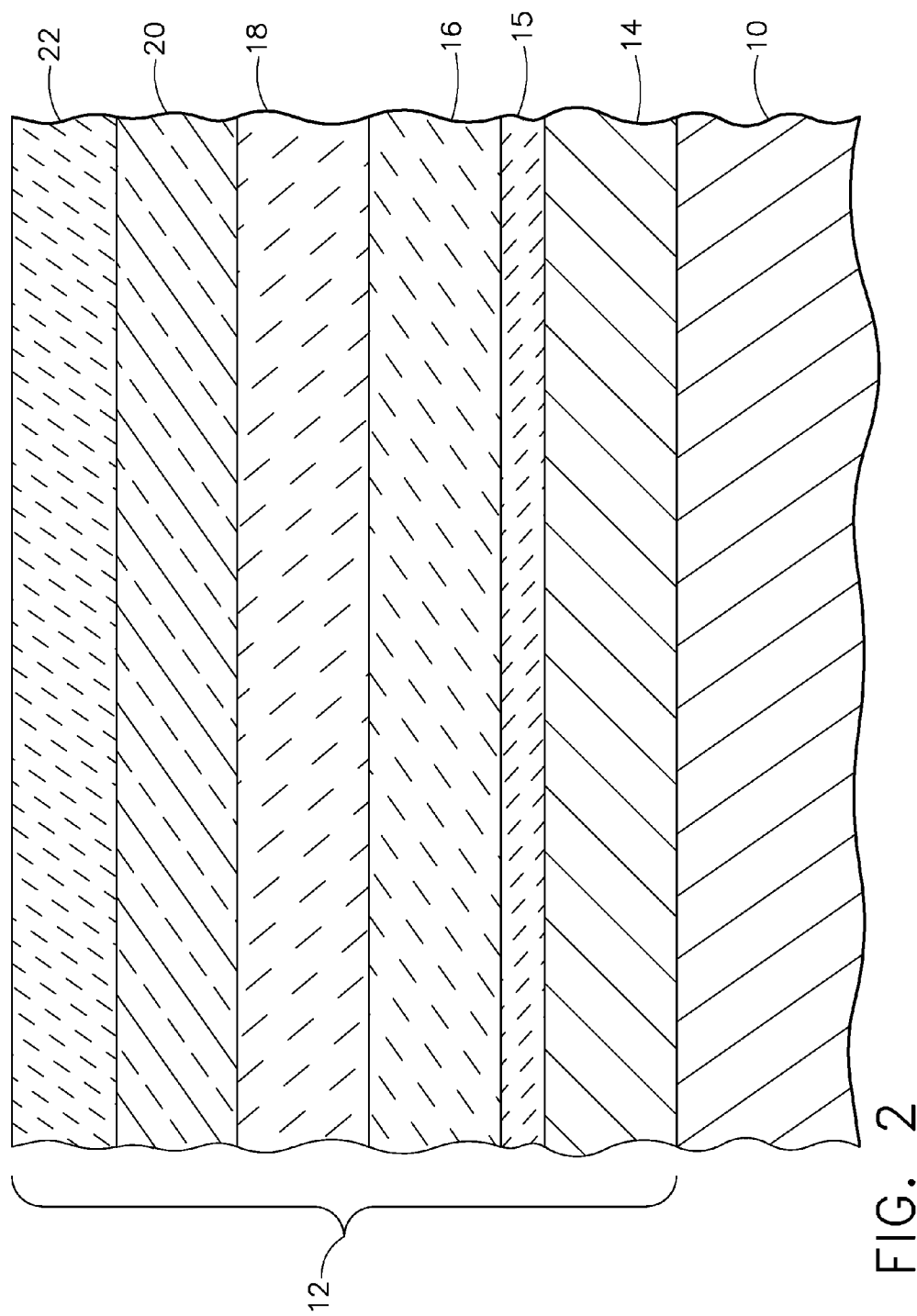
FIG. 2 is a schematic cross sectional view of one embodiment of an environmental barrier coating having a separate CMAS mitigation layer in accordance with the description herein.

As shown in FIG. 2, when CMAS mitigation is included in the EBC as a separate CMAS mitigation layer 20 on top of existing systems, "separate CMAS mitigation layer" 20 refers to compositions selected from zinc aluminate spinel ($ZnAl_2O_4$), alkaline earth zirconates ($AeZrO_3$), alkaline earth hafnates ($AeHfO_3$), rare earth aluminates ($Ln_3Al_5O_{12}$, $Ln_4Al_2O_9$), rare earth gallates ($Ln_3Ga_5O_{12}$, $Lna_4Ga_2O_9$), beryl, and combinations thereof.

As used herein, "Ae" represents the alkaline earth elements of magnesium (Mg), calcium (Ca), strontium (Sr), barium (Ba), and mixtures thereof. Additionally, as used herein throughout, "Ln" refers to the rare earth elements of scandium (Sc), yttrium (Y), lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), lutetium (Lu), and mixtures thereof, while "Lna" refers to the rare earth elements of lanthanum (La), cerium (Ce), praseodymium (Pr), neodymium (Nd), promethium (Pm), samarium (Sm), europium (Eu), gadolinium (Gd), and mixtures thereof. In one embodiment, CMAS mitigation layer 20 may comprise up to about 40% porosity, and in another embodiment less than about 10% porosity.

By way of example and not limitation, when including a separate CMAS mitigation layer 20, the EBC may comprise one of the following architectures: a silicon bond coat layer 14, an optional silica layer 15, a mullite-BSAS transition layer 16, an outer layer 18, a separate CMAS mitigation layer 20, and optionally, an abradable layer 22; a silicon bond coat layer 14, an optional silica layer 15, a rare earth disilicate transition layer 16, an outer layer 18, a separate CMAS mitigation layer 20, and optionally, an abradable layer 22; a silicon bond coat layer 14, an optional silica layer 15, a mullite transition layer 16, an outer layer 18, a separate CMAS mitigation layer 20, and optionally, an abradable layer 22; a silicon bond coat layer 14, an optional silica layer 15, a rare earth disilicate transition layer 16, a separate CMAS mitigation layer 20, and optionally, an abradable layer 22; a silicon bond coat layer 14, an optional silica layer 15, a rare earth disilicate transition layer 16, a BSAS transition layer 16, a rare earth disilicate transition layer 16, a separate CMAS mitigation layer 20, and optionally, an abradable layer 22; a silicon bond coat layer 14, an optional silica layer 15, a rare earth disilicate transition layer 16, a BSAS transition layer 16, a rare earth disilicate transition layer 16, an outer layer 18, a separate CMAS mitigation layer 20, and optionally, an abradable layer 22; a silicon bond coat layer 14, an optional silica layer 15, a rare earth disilicate transition layer 16, a BSAS transition layer 16, an outer layer 18, a separate CMAS mitigation layer 20, and optionally, an abradable layer 22.

In the previous examples, optional abradable layer 22 may comprise the same material present in separate CMAS mitigation layer 20, a rare earth disilicate ($Ln_2Si_2O_7$), or BSAS. The abradable may be a highly porous layer comprising up to about 50% porosity, or it may consist of patterned ridges that are dense (less than about 10% porosity) or porous (up to about 50% porosity). Abradable layer 22 can abrade upon impact from an adjacent, rotating engine component. The energy absorbed into the abradable coating can help prevent damage from incurring to the adjacent, rotating engine component. For example, in one embodiment, the EBC plus abradable layer could be present on a CMC shroud. Adjacent rotating blades having a tight clearance with the shroud could result in an impact event. The presence of abradable layer 22 can help prevent damage to the rotating blades.

As shown in FIG. 3, and as previously described, CMAS mitigation may alternately be included as an integrated CMAS mitigation layer 120. In this instance, "integrated CMAS mitigation layer" 120 refers to a layer comprising CMAS mitigation compositions in combination with any of the outer layer materials. More particularly, the CMAS mitigation composition can be included as either discrete dispersed refractory particles in the outer layer materials, or as a grain boundary phase in the outer layer materials. As previously defined, the "outer layer materials" may comprise any of BSAS, rare earth silicates, or combinations thereof.

As used herein, "integrated CMAS mitigation layer" 120 may include any of the outer layer materials with the addition of a CMAS mitigation composition selected from zinc aluminate spinel ($ZnAl_2O_4$), alkaline earth zirconates ($AeZrO_3$), alkaline earth hafnates ($AeHfO_3$), hafnium silicate, zirconium silicate, rare earth aluminates ($Ln_3Al_5O_{12}$, $Ln_4Al_2O_9$), rare earth gallates ($Ln_3Ga_5O_{12}$, $Lna_4Ga_2O_9$), rare earth phosphates ($LnPO_4$), tantalum oxide, beryl, alkaline earth aluminates ($AeAl_{12}O_{19}$, $AeAl_4O_9$), rare earth aluminates ($Ln_3Al_5O_{12}$ and $Ln_4Al_2O_9$), and combinations thereof.

By way of example and not limitation, EBCs having an integrated CMAS mitigation layer 120 may comprise one of the following architectures: a silicon bond coat layer 14, an optional silica layer 15, a mullite-BSAS transition layer 16, and an integrated CMAS mitigation layer 120; a silicon bond coat layer 14, an optional silica layer 15, a mullite transition layer 16, and an integrated CMAS mitigation layer 120; a silicon bond coat layer 14, an optional silica layer 15, a rare earth disilicate transition layer 16, and an integrated CMAS mitigation layer 120; a silicon bond coat layer 14, an optional silica layer 15, a mullite-BSAS transition layer 16, a BSAS outer layer 18, and an integrated CMAS mitigation layer 120; a silicon bond coat layer 14, an optional silica layer 15, a mullite transition layer 16, a BSAS outer layer 18, and an integrated CMAS mitigation layer 120; a silicon bond coat layer 14, an optional silica layer 15, a rare earth disilicate transition layer 16, a BSAS outer layer 18, and an integrated CMAS mitigation layer 120.

Regardless of the particular architecture of the EBC with CMAS mitigation, the component can be coated using conventional methods known to those skilled in the art to produce all desired layers and selectively place the CMAS mitigation composition(s) as either a separate layer, a grain boundary phase, or discrete, dispersed refractory particles. Such conventional methods can generally include, but should not be limited to, plasma spraying, high velocity plasma spraying, low pressure plasma spraying, solution plasma spraying, suspension plasma spraying, chemical vapor deposition (CVD), electron beam physical vapor deposition (EBPVD), sol-gel, sputtering, slurry processes such as dipping, spraying, tapecasting, rolling, and painting, and combinations of these methods. Once coated, the substrate component may be dried and sintered using either conventional methods, or unconventional methods such as microwave sintering, laser sintering or infrared sintering. Unless an abradable layer is present, the CMAS mitigation layer, whether separate or integrated, can be the outermost layer of the EBC.

More specifically, dispersion of the refractory particles into the outer layer can occur by various means depending on the process chosen to deposit the barrier coating. For a plasma spray process, particles of any of the outer layer materials can be mixed with the CMAS mitigation refractory particles before coating deposition. Mixing may consist of combining the outer layer material and the refractory particles without a liquid, or by mixing a slurry of the outer layer material and refractory particles. The dry particles or slurries can then be mechanically agitated using a roller mill, planetary mill, blender, paddle mixer, ultrasonic horn, or any other method known to those skilled in the art. For the slurry process, the refractory particles dispersed in the slurry will become dispersed particles in the coating after drying and sintering of a slurry-deposited layer.

In order to maintain discrete, refractory particles in the microstructure, the average particle size of the CMAS mitigation refractory particles in the slurry can be greater than about 20 nm, and in one embodiment from about 200 nm to about 10 micrometers in size. The refractory particles can comprise from about 1% to about 60% by volume of the layer, with the remainder being outer layer material, or outer layer material and porosity.

The CMAS mitigation grain boundary phase can be produced in a variety of ways, including particle coating and slurry methods. In one example, the CMAS grain boundary phase can be achieved by coating particles of an outer layer material with the desired CMAS mitigation composition(s) before the outer layer material is deposited on the ceramic substrate using a conventional method known to those skilled in the art. Coating the BSAS or rare earth silicate particles can be accomplished by chemical vapor deposition on particles in a fluidized bed reactor or by a solution (sol-gel) type process where precursors of the CMAS mitigation composition are deposited onto the outer layer material particles from a liquid phase, followed by heat treatment of the BSAS or rare earth silicate particles to form the desired CMAS mitigation composition on the surface of the BSAS or rare earth silicate particles. Once the BSAS or rare earth silicate particles with the CMAS mitigation composition are obtained, the substrate component can be coated, dried, and sintered using any of the previously described methods known to those skilled in the art. Ultimately, the surface layer of the CMAS mitigation composition on the BSAS or rare earth silicate particles becomes the grain boundary phase in the coating. In these instances, to form the grain boundary phase, the refractory particles can have an average size of less than about 100 nm. If the grain boundary particles are larger than about 100 nm, they will be dispersed in the outer layer as described previously rather than forming a grain boundary phase. If the grain boundary particles are larger than about 100 nm, they will be dispersed in the outer layer as described previously rather than serving as a grain boundary phase.

In one embodiment, the sol-gel solution, may be an aqueous solution comprised of soluble salts, while in another embodiment, the sol-gel solution may be an organic solvent solution containing an organic salt. As used herein, "soluble salts" may include, but are not limited to, alkaline earth nitrates, alkaline earth acetates, alkaline earth chlorides, rare earth nitrates, rare earth acetates, rare earth chlorides, aluminum nitrate, aluminum acetate, aluminum chloride, ammonium phosphate, phosphoric acid, polyvinyl phosphonic acid, gallium nitrate, gallium acetate, gallium chloride, zinc nitrate, zinc acetate, zinc chloride, zirconyl chloride, zirconyl nitrate, ammonium tantalum oxalate, ammonium niobium oxalate, beryllium nitrate, beryllium acetate, beryllium chloride, hafnium chloride, hafnium oxychloride hydrate, and combinations thereof.

As used herein, "organic solvents" may include methanol, ethanol, propanol, butanol, pentanol, hexanol, heptanol, octanol, acetone, methyl isobutyl ketone (MIBK), methyl ethyl ketone (MEK), toluene, heptane, xylene, or combinations thereof. As used herein, "organic salts" can include aluminum butoxide, aluminum di-s-butoxide ethylacetoacetate, aluminum diisopropoxide ethylacetoacetate, aluminum ethoxide, aluminum ethoxyethoxyethoxide, aluminum 3,5-heptanedionate, aluminum isopropoxide, aluminum 9-octadecenylacetoacetate diisopropoxide, aluminum 2,4-pentanedionate, aluminum pentanedionate bis (ethylacetoacetate), aluminum 2,2,6,6-tetramethyl3,5-heptanedionate, and aluminum phenoxide, gallium 8-hydroxyquinolinate, gallium 2,4-pentanedionate, gallium ethoxide, gallium isopropoxide, and gallium 2,2,6,6-tetramethylheptanedionate, calcium isopropoxide, calcium methoxyethoxide, calcium methoxide, calcium ethoxide, strontium isopropoxide, strontium methoxypropoxide, strontium 2,4-pentanedionate, strontium 2,2,6,6-tetramethyl-3,5-heptanedionate, magnesium ethoxide, magnesium methoxide, magnesium methoxyethoxide, magnesium 2,4-pentanedionate, magnesium n-propoxide, barium isopropoxide, barium methoxypropoxide, barium 2,4-pentanedionate, barium 2,2,6,6-tetramethyl-3,5-heptanedionate, rare earth methoxyethoxide, rare earth isopropoxide, rare earth 2,4-pentanedionate, zinc N,N-dimethylaminoethoxide, zinc 8-hydroxyquinolinate, zinc methoxyethoxide, zinc 2,4-pentaedianote, zinc 2,2,6,6-tetramethyl-3,5-heptanedianate, zirconium butoxide, zirconium dibutoxide, zirconium diisopropoxide, zirconium dimethacrylate dibutoxide, zirconium ethoxide, zirconium 2-ethylhexoxide, zirconium 3,5-heptanedionate, zirconium isopropoxide, zirconium methacryloxyethylacetoacetate tri-n-butoxide, zirconium 2-methyl-2-butoxie, zirconium 2-methoxymethyl-2-propoxide, zirconium 2,4-pentanedionate, zirconium n-propoxide, zirconium 2,2,6,6-tetramethyl-3,5-heptanedionate, hafnium n-butoxide, hafnium t-butoxide, hafnium di-n-butoxide, hafnium ethoxide, hafnium 2-ethylhexoxide, hafnium 2-methoxymethyl-2-propoxide, hafnium 2,4-pentanedionate, hafnium tetramethylheptanedionate, niobium V n-butoxide, niobium V ethoxide, tantalum V n-butoxide, tantalum V ethoxide, tantalum V isopropoxide, tantalum V methoxide, tantalum tetraethoxide dimethylaminoethoxide, tantalum V tetraethoxide pentanedionate, polyvinyl phosphonic acid, polyvinyl phosphoric acid, and combinations thereof.

Regardless of whether the CMAS mitigation composition is present as a separate mitigation layer on top of the existing EBC systems, or as an integrated mitigation layer (e.g. discrete dispersed refractory particles, or a grain boundary phase), the benefits are the same. Namely, CMAS mitigation compositions can help prevent the EBC from degradation due to reaction with CMAS in high temperature engine environments. More particularly, CMAS mitigation compositions can help prevent or slow the reaction of CMAS with the barrier coating that can form secondary phases that rapidly volatilize in steam. Additionally, CMAS mitigation compositions can help prevent or slow the penetration of CMAS through the barrier coating along the grain boundaries into a nonoxide, silicon-based substrate. Reaction of CMAS with substrates such as silicon nitrate and silicon carbide evolve nitrogen-containing and carbonaceous gases, respectively. Pressure from this gas evolution can result in blister formation within the EBC coating. These blisters can easily rupture and destroy the hermetic seal against water vapor provided by the EBC in the first instance.

The presence of CMAS mitigation compositions can help prevent or slow the attack of molten silicates on the EBC, thereby allowing the EBC to perform its function of sealing the CMC from corrosive attack in high temperature steam. Moreover, CMAS mitigation compositions can help prevent recession of the CMC, and also any layers of the EBC that may be susceptible to steam recession if CMAS reacts with it, to form steam-volatile secondary phases. Dimensional changes of ceramic components due to steam recession can limit the life and/or functionality of the component in turbine engine applications. Thus, CMAS mitigation is important to allow the barrier coating to perform its functions; thereby allowing the CMC component to function properly and for its intended time span.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of making a component having calcium magnesium aluminosilicate (CMAS) mitigation capability, the method comprising:
   providing a component comprising a ceramic matrix composite or a monolithic ceramic;
   applying an environmental barrier coating to the component, the environmental barrier coating comprising:
   a bond coat layer comprising silicon overlying the component;
   an optional silica layer overlying the bond coat layer;
   at least one transition layer overlying the bond coat layer or the optional silica layer comprising a composition selected from the group consisting of mullite, barium strontium aluminosilicate (BSAS), rare earth disilicates, and combinations thereof;
   an optional outer layer comprising an outer layer material selected from the group consisting of BSAS, rare earth monosilicates, rare earth disilicates, and combinations thereof; and
   a separate CMAS mitigation layer overlying the at least one transition layer or the optional outer layer, wherein the separate CMAS mitigation layer consists of $Lna_4Ga_2O_9$ and optionally one or more compositions selected from the group consisting of zinc aluminum spinel, alkaline earth zirconates, alkaline earth hafnates, rare earth aluminates, rare earth gallates, beryl, and combinations thereof, wherein the separate CMAS mitigation layer contains $Lna_4Ga_2O_9$ in an amount sufficient to prevent degradation of the environmental barrier coating due to reaction with CMAS.

2. The method of claim 1, further comprising:
   applying an abradable layer to the separate CMAS mitigation layer.

3. The method of claim 2, wherein the abradable layer comprises $Lna_4Ga_2O_9$, a rare earth disilicate, or BSAS.

4. The method of claim 1, wherein the environmental barrier coating is applied by a method selected from the group consisting of plasma spraying, low pressure plasma spraying, solution plasma spraying, suspension plasma spraying, chemical vapor deposition, electron beam physical vapor deposition, sol-gel, sputtering, slurry dipping, slurry spraying, slurry painting, slurry rolling, tape-casting, and combinations thereof.

5. The method of claim 1, wherein the component is a turbine engine component selected from the group consisting of combustor components, turbine blades, shrouds, nozzles, heat shields, and vanes.

6. A method of making a component having CMAS mitigation capability, the method comprising:
   providing a component, wherein the component comprises a ceramic matrix composite or a monolithic ceramic;
   applying an environmental barrier coating to the component, the environmental barrier coating comprising a bond coat layer comprising silicon overlying the component;
   an optional silica layer overlying the bond coat layer;
   at least one transition layer overlying the bond coat layer or the optional silica layer comprising a composition selected from the group consisting of mullite, barium strontium aluminosilicate (BSAS), rare earth disilicates, and combinations thereof;
   an optional outer layer overlying the at least one transition layer, the optional outer layer comprising at least one outer layer material selected from the group consisting of BSAS, rare earth monosilicates, rare earth disilicates, and combinations thereof; and
   an integrated CMAS mitigation layer overlying the at least one transition layer or the optional outer layer including:
   at least one outer layer material; and
   a CMAS mitigation composition comprising $Lna_4Ga_2O_9$, wherein the integrated CMAS mitigation layer contains $Lna_4Ga_7O_9$ in an amount sufficient to prevent degradation of the environmental barrier coating due to reaction with CMAS.

7. The method of claim 6, further comprising:
   applying an abradable layer to the integrated CMAS mitigation layer.

8. The method of claim 7, wherein the abradable layer comprises $Lna_4Ga_2O_9$, a rare earth disilicate, or BSAS.

9. The method of claim 6, wherein the environmental barrier coating is applied by a method selected from the group consisting of plasma spraying, low pressure plasma spraying, solution plasma spraying, suspension plasma spraying, chemical vapor deposition, electron beam physical vapor deposition, sol-gel, sputtering, slurry dipping, slurry spraying, slurry painting, slurry rolling, tape-casting, and combinations thereof.

10. The method of claim 6, wherein the integrated CMAS mitigation layer comprises the CMAS mitigation composition as a grain boundary phase on the outer layer material or as dispersed refractory particles in the outer layer material.

11. The method of claim 6, wherein the component is a turbine engine component selected from the group consisting of combustor components, turbine blades, shrouds, nozzles, heat shields, and vanes.

12. A method of making a component having CMAS mitigation capability comprising:
   providing a component;
   applying an environmental barrier coating to the component, the barrier coating comprising:
   a bond coat layer comprising silicon;
   an optional silica layer;
   at least one transition layer comprising a composition selected from the group consisting of mullite, barium strontium aluminosilicate (BSAS), and combinations thereof;
   an optional outer layer comprising an outer layer material selected from the group consisting of BSAS, rare earth monosilicates, rare earth disilicates, and combinations thereof; and
   a separate CMAS mitigation layer consisting of $Lna_4Ga_2O_9$ and optionally one or more compositions selected from the group consisting of zinc aluminum spinel, alkaline earth zirconates, alkaline earth hafnates, rare earth aluminates, rare earth gallates, beryl, and combinations thereof or an integrated CMAS mitigation layer comprising $Lna_4Ga_2O_9$ and at least one outer layer material, wherein the separate CMAS mitigation layer or the integrated CMAS mitigation layer contains $Lna_4Ga_2O_9$ in an amount sufficient to prevent degradation of the environmental barrier coating due to reaction with CMAS.

13. The method of claim 12 further comprising:
   applying an abradable layer to the separate CMAS mitigation layer or the integrated CMAS mitigation layer.

14. The method of claim 13, wherein the abradable layer comprises $Lna_4Ga_2O_9$, a rare earth disilicate, or BSAS.

15. The method of claim 12, wherein the environmental barrier coating is applied by a method selected from the group consisting of plasma spraying, low pressure plasma spraying, solution plasma spraying, suspension plasma spraying, chemical vapor deposition, electron beam physical vapor deposition, sol-gel, sputtering, slurry dipping, slurry spraying, slurry painting, slurry rolling, tapecasting, and combinations thereof.

16. The method of claim 12, wherein the integrated CMAS mitigation layer comprises the CMAS mitigation composition as a grain boundary phase on the outer layer material or as dispersed refractory particles in the outer layer material.

17. The method of claim 12, wherein the component comprises a ceramic matrix composite or a monolithic ceramic.

18. The method of claim 12, wherein the component is a turbine engine component selected from the group consisting of combustor components, turbine blades, shrouds, nozzles, heat shields, and vanes.

\* \* \* \* \*

UNITED STATES PATENT AND TRADEMARK OFFICE
CERTIFICATE OF CORRECTION

PATENT NO. : 8,859,052 B2
APPLICATION NO. : 13/690219
DATED : October 14, 2014
INVENTOR(S) : Kirby et al.

Page 1 of 1

It is certified that error appears in the above-identified patent and that said Letters Patent is hereby corrected as shown below:

In the claims

In Column 10, Line 14, in Claim 6, delete "$Lna_4Ga_7O_9$" and insert -- $Lna_4Ga_2O_9$ --, therefor.

Signed and Sealed this
Twenty-ninth Day of December, 2015

Michelle K. Lee
*Director of the United States Patent and Trademark Office*